Dec. 19, 1967 G. L. MILLER 3,359,432

TRIGGER CIRCUIT EMPLOYING COMMON-BASE TRANSISTORS
AS STEERING MEANS AS IN A FLIP-FLOP
CIRCUIT FOR EXAMPLE

Filed Nov. 5, 1964 2 Sheets-Sheet 1

INVENTOR
G. L. MILLER
BY Leo Stanger
ATTORNEY

United States Patent Office 3,359,432
Patented Dec. 19, 1967

3,359,432

TRIGGER CIRCUIT EMPLOYING COMMON-BASE TRANSISTORS AS STEERING MEANS AS IN A FLIP-FLOP CIRCUIT FOR EXAMPLE

Gabriel L. Miller, Westfield, N.J., assignor to Bell Telephone Laboratories, Incorporated, New York, N.Y., a corporation of New York
Filed Nov. 5, 1964, Ser. No. 409,157
12 Claims. (Cl. 307—88.5)

This invention relates to trigger circuits, particularly for reversing the conduction pattern in a bistable transistorized flip-flop circuit with the trailing edge of an input pulse, as is common in counters and shift registers.

One type of such flip-flop triggering involves first rapidly charging a capacitor through a diode with the leading portion of a trigger pulse, then releasing the charge with the voltage change at the trailing edge of the pulse, and then passing the resulting discharge current into the base-emitter circuit of the conducting one of the flip-flop transistors against the forward direction of the base-emitter junction. This turns off the previously conducting transistor, and the flip-flop interconnections turn on the previously nonconducting transistors.

A succeeding pulse then charges a second capacitor through a second diode and releases the charge with its trailing edge. This flips the circuit by discharging the capacitor against the forward direction of the base-emitter junction in the other now conducting transistor, thereby turning it off.

The heavy biasing of many flip-flop circuits generally saturates the conducting transistor. To insure fast and reliable triggering and desaturation of the conducting transistor, the charge stored in turn on each trigger capacitor must exceed that necessary to produce a current turning off its transistor. However, the charge remaining on the discharging capacitor after it has turned off its transistor and caused turn-on of the other transistor presents a problem. The reverse impedance in the base-emitter junction of the just extinguished transistor is much higher than when the transistor conducts. Thus, the partially charged capacitor may not continue discharging but may still be applying an off-bias on the transistor it has extinguished by the time a succeeding pulse arrives. This lingering off-bias interferes with the succeeding pulse's attempt to extinguish the saturation of the other now conducting transistor with another capacitor and thereby to turn on the transistor extinguished by the first still partially charged capacitor. That is to say, the remaining charge on the first capacitor biases off the already off first transistor and interferes with the flipping process of the second pulse. Thus, the inability of the capacitor to discharge after extinguishing its transistor presents a particular problem at fast pulse rates.

An object of this invention is to avoid this problem. Another more general object of the invention is to improve trigger circuits for bistable flip-flops.

Still another object of the invention is to trigger flip-flops with such circuits as are particularly suitable for production by microelectronic techniques.

According to the invention these objects are accomplished, in whole or in part, by directing each discharge current from a capacitor to its saturated flip-flop transistor through respective common-base steering transistors whose emitter-base junctions carry the discharge current from the capacitors in the forward direction. These forward emitter-base junctions always establish low impedance paths for the discharge currents of their capacitors. This is so regardless of the conducting condition of the flip-flop transistor to which each collector is connected because the current can always pass through the low-forward-impedance base-emitter junction of the common base steering transistor. On the other hand, the steering transistor collectors pass enough desaturating current through the saturated flip-flop transistor to turn it off. In the common base configuration the steering transistors exhibit no charge amplification so that they saturate only slightly and turn off easily after the capacitors discharge through their low impedance emitter-base inputs.

These and other features of the invention are pointed out more particularly in the claims forming a part of this specification. Other objects and advantages of the invention will become obvious from the following detailed description when read in light of the accompanying drawings, wherein:

Figure 1:
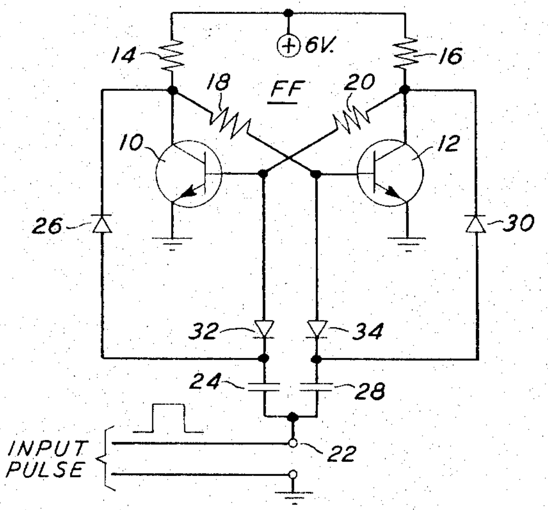
FIG. 1 PRIOR ART
FIG. 1 is a schematic circuit diagram of a flip-flop circuit being triggered according to the prior art.

The conventional flip-flop circuit FF in FIG. 1 is triggered according to the prior art and comprises two n-p-n transistors 10 and 12 having grounded emitters, and collectors energized from a +6 volt source through collector resistors 14 and 16. Feedback resistors 18 and 20 cross-connect the respective collectors to the opposite bases. The feedback resistors in the usual manner bias off one transistor while the other transistor conducts heavily.

Assuming that transistor 10 conducts and transistor 12 is off, a positive pulse applied to an input terminal 22 rapidly charges a capacitor 24 through a charging diode 26 connecting the capacitor to the collector of transistor 10, and through the conducing transistor 10. This stores the pulse value on the capacitor 24. A corresponding capacitor 28 is unable to charge through a similar charging diode 30 connected from the capacitor to the collector of transistor 12 because the latter is nonconducting. When the positive going pulse returns to zero the charge on the capacitor 24 is released. The capacitor 24 attempts to discharge through a path comprising the pulse source at terminal 22, ground, the emitter-base terminal of conducting and saturated transistor 10 and through a diode 32 connecting the base of transistor 10 to the capacitor with the polarity shown. The comparatively low impedance of the emitter-base circuit of transistor 10 during conduction thereof permits heavy emitter-to-base current flow and desaturates the transistor 10. This desaturation sets off the conventional and well known process that eventually heavily turns on and saturates the transistor 12 and turns off the transistor 10.

A succeeding positive pulse at the terminal 22 now charges the capacitor 28 through a diode 30 and conducting transistor 12. Upon release of the capacitor 28 by return of the second positive pulse to zero magnitude, the capacitor 28 discharges through the pulse source at the terminal 22, the emitter-base junction of conducting transistor 12 and a diode 34 connecting the base of transistor 12 to the capacitor 28. Succeeding pulses again flip the bistable circuit back and forth.

While the diodes 26 and 30 are illustrated as connecting the capacitors 24 and 28 to ground through the alternately conducting transistors 10 and 12 they may connect to ground through other switching means of alternate character that determine which of the capacitors 24 and 28 is to be charged and thereby when so connected constitute a control of the bistable flip-flop.

Because the transistors 10 and 12 heavily saturate during conduction it is essential that the capacitors 24 and 28 retain sufficient charge during each pulse to provide a heavy desaturating current through the emitter-base circuit of these transistors. In fact, the charge on the capacitor must exceed that necessary to desaturate the trantransistor to obtain reliable switching. However, the charge remaining on the capacitors after the respective translators are turned off encounters a heavy reverse impedance in the emitter-base circuits of the transistors so that discharge becomes difficult and slow. This charge which biases the transistor off may remain until the succeeding pulse attempts to bias off the opposing transistor and may prevent the first transistor from being turned on. Attempts have been made to alleviate this problem with resistors across the diodes 26 and 30. However, this reduces the efficiency of the diodes 26 and 30 and fails to solve the problem.

Figure 2:
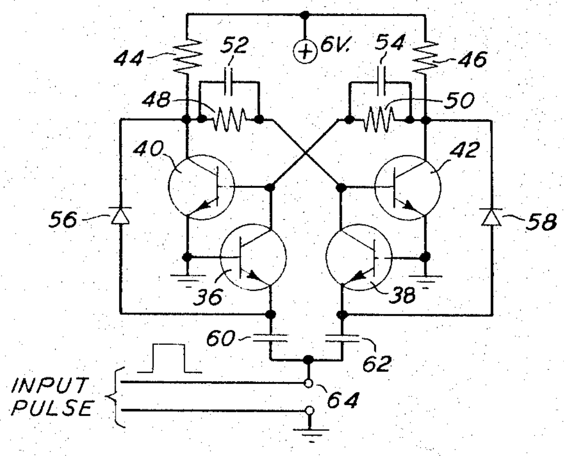
FIG. 2 is a schematic circuit diagram of a flip-flop having a triggering circuit embodying features of the invention.

The embodiment illustrated in FIG. 2 solves this problem by substituting for the diodes 32 and 34 two type 2N709 n-p-n transistors 36 and 38 whose bases connect to ground and whose collectors and emitters connect as shown. For this circuit, component values are given only as examples. Two type 2N709 n-p-n flip-flop transistors 40 and 42, two 500 ohm collector-energizing resistors 44 and 46, and two 1K collector-to-base crossconnecting resistors 48 and 50, correspond respectively to the transistors 10 and 12 and resistors 14, 16, 18, and 20 of FIG. 1 to form a conventional bistable flip-flop circuit in FIG. 2. Two 5 pf. capacitors 52 and 54 connected in parallel with respective resistors 48 and 50 help the efficiency of the circuit but constiute no basic change from FIG. 1 in its mode of operation. Two Q6100 diodes 56 and 58 connecting respective capacitors 60 and 62 to the collectors of transistors 40 and 42 correspond to the diodes 26 and 30, while two 20 pf. capacitors 60 and 62 correspond to the charging capacitors 24 and 28. An input terminal 64 corresponding to input terminal 22 connects to the emitters of transistors 36 and 38 through the respective capacitors 60 and 62.

In operation, one of the transistors, for example transistor 40, is first saturated while the other is nonconductive. Transistors 36 and 38 do not conduct at this time. When a positive pulse is applied to an input terminal 64, the capacitor 60 charges rapidly through the low impedance of conducting transistor 40 and the diode 56. The capacitor 62 is unable to charge through the nonconducting transistor 42, nor through the high reverse impedance of the emitter-base junction on the nonconducting transistor 38. When the capacitor is released upon occurrence of the trailing edge of the positive going pulse, thereby producing a zero voltage at the terminal 64, the capacitor 60 discharges through the pulse source, ground, the base of transistor 36, and the emitter of the transistor 36 because this emitter-base circuit now presents a forward, easy path of current flow. This produces a current flow from the collector to the base of transistor 36 and hence a current flow counter to the polarity of the base-emitter junction of the conducting transistor 40. The now conducting transistor 36 thus turns off the previously saturated transistor 40 which flips the bistable flip-flop circuit. Transistor 40 is then off and transistor 42 thus saturates. The capacitor 60 may also be said to have started discharging through the input terminal 64, ground, the emitter-base circuit of transistor 40, and the collector-emitter circuit of the transistor 36.

Despite the desaturation of transistor 40 causing the emitter-base junction to impose a high impedance in the path of current therethrough, the capacitor 60 can continue to discharge rapidly through a path of easy current flow in the base-emitter circuit of transistor 36. This frees the transistor 40 of an off-bias very quickly.

When a succeeding positive pulse arrives at the terminal 64, the capacitor 62 charges through the now saturated transistor 42 and diode 58. Because the capacitor 60 has had a path of easy current flow it will have discharged by the advent of the next pulse and most certainly by the advent of the trailing edge of the next pulse with input frequencies much higher than those possible with FIG. 1. Thus, the capacitor 60 applies no off-bias to the emitter-base junction of the transistor 40 to decrease the flipping effect of the second pulse. The trailing edge of the second pulse turns off transistor 42 by discharge of capacitor 62 through transistor 38 and the base-emitter circuit of transistor 42. This simultaneously turns on transistor 40. Succeeding pulses thus also have the ability to flip the bistable circuit.

The common base connections of transistors 36 and 38 assure that no charge amplification occurs between the capacitors 60 and 62 and the transistors 40 and 42. Such charge amplification may result in heavy saturation of transistors 36 and 38. A finite time is always required to desaturate such transistors. Thus, if saturation were still prevalent in transistors 36 and 38 during the advent of a succeeding pulse, the positive going succeeding pulse may charge both capacitors. For example, if the transistor 36 remained saturated after turning off transistor 40 and turning on transistor 42, a succeeding positive pulse in addition to charging capacitor 62 through the conducting transistor 42 would also charge the capacitor 60 through the saturated base-emitter junction of transistor 36. This charge, of course, is as bad as the charge that remained on capacitors 24 and 28 in FIG. 1.

The heavy saturation of transistors 36 and 38, which is avoided by the common base configuration, would prevail if these transistors were common-emitter connected p-n-p types.

The circuit of FIG. 2 improves the high frequency operating limit of comparable circuits many times. In fact, using the circuit of FIG. 2, 100 mc./s scalers have been constructed.

As in FIG. 1, the diodes 56 and 58 of FIG. 2 sense which of the two transistors 40 or 42 is conducting at the time the leading edge of the trigger pulse is supplied at terminal 64 and stores this information in the capacitors 60 and 62, which constitute memories. The transistors 40 and 42 are effectively gating the input pulses. Other pulse inputs can be applied to the bases of transistors 40 and 42. These can also be gated, but from other gating or control transistors, with sensing diodes and memory capacitors. The other inputs can also utilize the common base transistors as is more clearly shown in FIG. 3.

Figure 3:
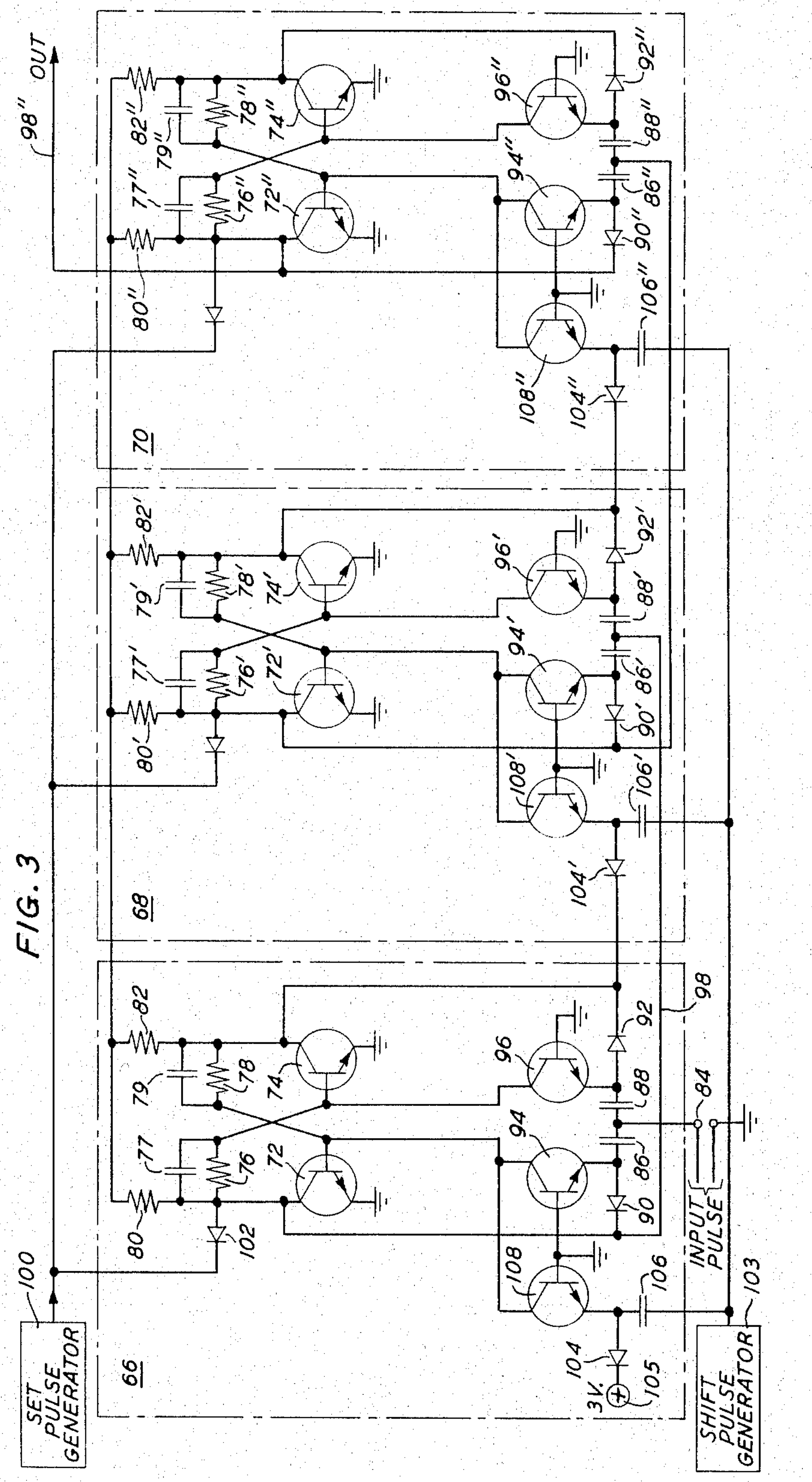
FIG. 3 is another circuit of a triggered flip-flop embodying features of the invention.

FIG. 3 is a count-shift register that operates as a counter or a shift register, depending upon which inputs are activated. The register comprises three substantially identical count-shift elements 66, 68, and 70, of which the element 66 will be described in detail. Here, a pair of n-p-n flip-flop transistors 72 and 74 correspond to the transistors 40 and 42 as well as 10 and 12 to form a bistable multivibrator. Crossconnecting resistors 76 and 78 joining the collectors of transistors 72 and 74 with the respective bases of transistors 74 and 72, collector energizing resistors 80 and 82 from a six volt source, and grounded emitter circuits complete the flip-flop. Capacitors 77 and 79 across resistors 76 and 78 correspond to capacitors 52 and 54. Supplying positive, one microsecond input pulses to the flip-flop is an input terminal 84. Two capacitors 86 and 88 receive charge from the leading portion of the pulse through respective sensing diodes 90 and 92 and respective transistors 72 and 74, depending upon which of the two transistors 72 and 74 conducts. When the input pulse on terminal 84 ends and returns to its zero value at its trailing edge, the charged one of the capacitors 86 or 88, for example 86, discharges through ground, the reverse polarity of the base-emitter circuit in the saturated transistor 72, and through a common base connected transistor 94. This compares in operation to the circuit of FIG. 2. When transistor 74 is sensed as conducting, a transistor 96 provides a discharge path for the capacitor 88 both before and after the transistor 74 has been turned off and the bistable circuit flipped over.

When the flip-flop circuit changes its conduction pattern an output step corresponding to the change at the collector of transistor 72 is applied over a line 98 to the input point of the second count-shift element 68. In element 68, for simplicity, the components of the flip-flop, as well as the trigger circuit, corresponding to those in the element 66 are designated with like numerals and a prime designation. An output line 98′ from the collector of the transistor 72′ connects to the input of the third count-shift element 70 whose components corresponding to those of the other two elements are designated with like numerals but double primes. The output of this element from the transistor 72″ appears at a line 98″.

A set pulse generator 100 produces a one microsecond negative going set pulse which is applied through respective diodes 102, 102′, and 102″ to the collectors of transistors 72, 72′, and 72″. This pulse effectively biases all the transistors having numerals 72 (namely 72, 72′ and 72″ and 74 (namely 74, 74′ and 74″) in such a manner that transistors 72, 72′ and 72″ go on, whereas transistors 74, 74′ and 74″ go off. This is because the negative pulse lowers the collector voltages on n-p-n transistors 72, 72′ and 72″, and passes a current counter to the base-emitter junction of transistors 74, 74′ and 74″. The conductive condition of transistors 72, 72′, and 72″ being on the nonconductive condition of transistors 74, 74′ and 74″ being off thus represents "zero" in each element 66, 68, and 70, whereas the reverse represents "one" in each of these elements.

When the elements 66, 68, and 70 are set to zero, a pulse applied to the input 84 charges the capacitor 86 through the diode 90 and conducting transistor 72. At the trailing edge of the pulse the charged capacitor 86 discharges through ground, the base-emitter circuit of conducting transistor 72, and the collector emitter circuit of transistor 94. This discharge turns off the transistor 72 and the capacitor 86 continues to discharge through the base-emitter circuit of transistor 94. Turning off transistor 72 turns on transistor 74. During a second pulse, the diode 92 senses the conductivity of transistor 74 and stores it on capacitor 88, which at the trailing edge of the pulse discharges to extinguish transistor 74 and turn on transistor 72.

At the first flip of transistor 72 to the off condition the voltage at its collector rose and passed the current through line 98 to charge the capacitor 86′ through the diode 90′ and the conducting transistor 72′. This charge remained until the end of the second pulse at terminal 84, when capacitor 88 discharged and turned on transistor 72. The conduction of transistor 72 lowers the voltage at its collector and constitutes the trailing edge of a pulse which started when this transistor was first turned off. This trailing edge permits discharge of the capacitor 86′ through the now conducting transistor 72 to ground, through the reverse polarity of the emitter-base circuit in conducting transistor 72′, through the transistor 94′ to turn off transistor 72′ and turn on 74′. Remaining charge passes through the base-emitter circuit of transistor 94′ The condition of elements 66, 68, and 70 is now 0, 1, 0 respectively.

A third pulse at terminal 84 flips the transistors 72 and 74 to change that condition to 1, 1, 0 respectively. A fourth pulse then again causes transistor 72 to conduct, which in turn flips the next element 68 to cause transistor 72′ to saturate and thereby turn on transistor 74″ and turn off transistor 72″. The numerals then indicated by elements 66, 68, and 70 are 0, 0, 1 with the element 70 carrying the highest order and element 66 the lowest order. Thus, for four pulses the binary value indicated is 100 or the decimal value 4.

The count-shift register of FIG. 3, however, is capable not only of counting but of shifting the value into a higher order. That is, it is capable of shifting the values in elements 66 and 68 to the elements 68 and 70. Assume first the value 0, 1, and 0 in elements 66, 68, and 70, so that the transistors 72, 74′ and 72″ are conducting and saturated. A shift pulse generator 103 produces a three microsecond positive pulse which it attempts to apply through three diodes 104, 104′ and 104″ to three capacitors 106, 106′ and 106″ to which it is connected. At the leading edge of this positive pulse the diodes 104′ and 104″ connected to collectors of respective transistors 74 and 74′ sense the conducting condition of these transistors. The diode 104 connects to a +3 volt source 105 and prevents charging of capacitors 106. Since only transistor 74′ conducts, the diode 104′ permits only one of the other two capacitors 106′ and 106″, namely capacitor 106″, to charge. The capacitor 106′ remains uncharged. Thus, capacitors 106′ and 106″ memorize the "values" in elements 66 and 68.

After one microsecond during the three microsecond positive shift pulse, the set pulse generator produces a one microsecond negative pulse which has the effect of flipping all the elements to their zero positions so that the transistors 72, 72′ and 72″ now conduct. However, the prior conducting condition of transistor 74′ has been memorized by the capacitor 106′. At the end of the three microsecond shift pulse the charge on the capacitor 106 is released through the shift pulse generator 103 to ground, through the emitter-base circuit of the conducting transistor 72″, and through a transistor 108″. The collector of transistor 108′ connects as shown to the base of transistor 72″, and its base is grounded. The transistor 108″, similar to the transistors 94, 94′ and 94″, completely discharges the capacitor while permitting the capacitor to trigger the flip-flop so that transistor 74″ conducts.

Transistor 108′ has counterparts in the element 68 identified as 108″ and in the element 66 as 108. In the element 66 the transistor 108 has its emitter connected through the diode 104 to the constant +3 volt source 105. This keeps it substantially inactive but allows the elements 66, 68, and 70 to be constructed identically. In all three elements 66, 68, and 70 the transistors 94, 94′ and 94″ and 108, 108′ and 108″ have collectors connected together and bases connected to ground. This configuration is peculiarly adaptable to microcircuitry so that a single composite transistor for the two transistors 94 and 108 can be constructed as shown in FIG. 4.

Figure 4:
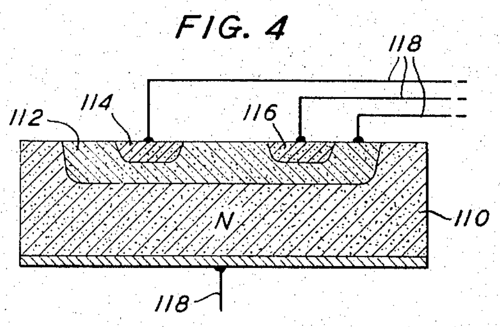
FIG. 4 is a schematic section of a microcircuit adaptable for use in FIG. 3.

In FIG. 4 a substrate 110 of N type silicon representing a collector supports a base zone 112 of P type silicon that forms a junction at the interface, and two emitter zones 114 and 116 of N type silicon forming two separate junctions at respective interfaces with the base zone 112. Ohmic junctions connect respective lines designated 118 to the collector substrate 110 and the single base zone 112 and the two emitters 114 and 116. Thus, a single collector and a single base is sufficient in this microcircuit for two transistors having two emitters separately connected. This composite transistor can replace the two transistors 94 and 108 or 94′ and 108′, or 94″ and 108″ whose respective collectors are connected together and have common grounded bases.

The steering transistors 36, 38, 108, 94, 96, 108′, 94′, 96′, 108″, 94″, and 96″ effect reliable triggering of their respective flip-flops even if they have low values of $\alpha$. Thus the range of selection of transistor types for this function is comparatively wide.

While an embodiment of the invention has been described in detail, it will be obvious to those skilled in the art that the invention may be practiced otherwise without departing from its spirit and scope.

What is claimed is

1. A system, comprising a bistable flip-flop having two alternately conducting transistors, said transistors having respective bases, energy storage means for each transistor, input terminal means connectable to a source of electric pulses, two control means each for selectively applying to one of said energy storage means the voltage at said terminal means, and two common base transistor amplifier means each having an emitter electrode connected to said energy storage means and a collector electrode connected to the base of one of said alternately conducting transistors said control means each including one of said alternately conducting transistors, said control means and said common base transistor means each forming separate loops with each of said energy storage means and having directions of easy current flow to alternately energize and de-energize said storage means through the different loops in response to pulses at said terminal means.

2. An electrical system, comprising a bistable flip-flop having two alternately conducting transistors, said transistors having respective bases and collectors, two energy storage means, input means for connecting each energy storage means to a pulse source, two control means each for alternately charging one of said energy storage means in response to pulses at said input means and each including said input means and one of said transistors and a diode all in series, and two semiconductor means for transferring charge from said energy storage means to one of said alternately conducting transistors in response to the end of a pulse at said input means and including a common-base connected transistor connecting each of said energy storage means with the base of one of said transistors.

3. An electrical circuit, comprising a bistable flip-flop having two alternately conducting transistors, said transistors having respective base-emitter circuits and collectors, a plurality of input means connectable to pulse sources, a plurality of control switch means including said saturable transistors, a plurality of energy storage means each connected to one of said input means, a plurality of network means each for energizing one of said energy storage means in response to pulses at said input means and simultaneously in response to the condition of one of said switch means, said network means each including one of said input means and one of said switch means, and a plurality of semiconductor means each for de-energizing one said energy storage means through one of said base-emitter circuits counter to its path of easy current flow and including a common-base connected transistor, said semiconductor means each applying substantially all the energy of respective ones of said energy storage means into said transistor amplifier and said alternately conducting transistor.

4. An electrical circuit, comprising a bistable flip-flop having two alternately conducting transistors, said transistors having respective base-emitter circuits and collectors, a plurality of input means connectable to pulse sources, a plurality of control switch means including said saturable transistors, a plurality of energy storage means each connected to one of said input means, a plurality of network means each for energizing one of said energy storage means in response to pulses at said input means and simultaneously in response to the condition of one of said switch means, said network means each including one of said input means and one of said switch means, and a plurality of semiconductor means for de-energizing respective ones of said energy storage means through the same one of said base-emitter circuits counter to its path of easy current flow and each including a common-base connected transistor amplifier.

5. An electrical circuit comprising a bistable flip-flop having two alternately conducting transistors, said transistors having respective base-emitter circuits and collectors, a plurality of input means connectable to pulse sources, a plurality of control switch means including said saturable transistors, a plurality of energy storage means each connected to one of said input means, a plurality of network means each for energizing one of said energy storage means in response to pulses at said input means and simultaneously in response to the condition of one of said switch means, said network means each including one of said input means and one of said switch means, and a plurality of semiconductor means for de-energizing respective ones of said energy storage means through the same one of said base-emitter circuits counter to its path of easy current flow and including a common-base connected transistor amplifier, said plurality of said semiconductor means connecting a plurality of said energy storage means to the same base of the same transistor being composed of a single semiconductor structure, said structure having a single collector zone and a single base zone, said structure having a plurality of emitter zones.

6. A shift register-counter, comprising a plurality of successive counter elements each having two alternately conducting transistors forming a flip-flop, said transistors each having an emitter-base circuit and a collector, two energy storage means in each counter element, input means connected to each of said energy storage means in each counter element, two diode means each connecting said energy storage means to the collector of said alternately conducting transistors in each of said counter elements, two common-base connected transistors having respective emitter collector circuits each connecting one of said energy storage means to the base-emitter circuit of said alternately conducting transistors in each element, a collector in each of said two alternately conducting transistors in each of said elements forming an output for each of said elements, the output of each element being connected to the input means of the successive element, said input means of said first element being connectable to a pulse source, circuit means for providing a zero set pulse to each of said elements including a diode connected to one of said alternately conducting transistors of each of said elements and connectable to a single set pulse source, a shift capacitor in each of said elements, network means for connecting said shift capacitor to a shift pulse source, unidirectional means connecting said capacitor of each element to the collectors of one of said alternately conducting transistors of said previous element, a steering transistor having common-base connection connecting said capacitor in each element to the one of said base-emitter circuits in each element.

7. A shift register-counter comprising a plurality of successive counter elements each having two alternately conducting transistors forming a flip-flop, said transistors each having an emitter-base circuit and a collector, two energy storage means in each counter element, input means connected to each of said energy storage means in each counter element, two diode means each connecting said energy storage means to the collector of said alternately conducting transistors in each of said counter elements, two common-base connected transistors having respective emitter-collector circuits each connecting one of said energy storage means to the base-emitter circuit of said alternately conducting transistors in each element, a collector in each of said two alternately conducting transistors in each of said elements forming an output for each of said elements, the output of each element being connected to the input means of the successive element, said input means of said first element being connectable to a pulse source, circuit means for providing a zero set pulse to each of said elements including a diode connected to one of said collectors in the alternately conducting transistors of each of said elements and connectable to a single set pulse source, a shift capacitor in each of said elements, network means for connecting said shift capacitor to a shift pulse source, unidirectional means connecting said capacitor of each element to the collectors of one of said alternately conducting transistors of said previous element, a steering transistor having common-base connection connecting said capacitor in each element to the one of said base-emitter circuits in each element, the steering transistor and common-base connected transistor connected to the same base-emitter circuit in one element being comprised of a single semiconductor structure having one collector zone, one base zone, and two emitter zones.

8. A circuit, comprising a transistor having an input and operable in alternately conductive states, switching means coacting with said transistor for changing the voltage at said input of said transistor and thereby switching said transistor into one of the states when signals are applied to said input and for subsequently recycling it to the other state, energy storage means, unidirectional means for applying energy to said energy storage means from a source of electric pulses, common-base transistor amplifier means responding to the source and said energy storage means for applying signals to said input of said transistor and thereby changing the state of said transistor, said common-base transistor amplifier means having an emitter-base junction and a collector-base junction, and conductive means having an impedance such as to de-energize said energy storage means in less time than it takes said switching means to recycle said transistor and including only said emitter-base junction of said junctions for removing the energy remaining in said energy storage means after the state of said first transistor is changed by said common-base transistor means.

9. A circuit as in claim 8 wherein said switching means and said transistor form a bistable multivibrator having a second transistor, and said switching means include means for triggering said second transistor.

10. A circuit as in claim 8 wherein said energy storage means include a capacitor and said unidirectional means include a diode and the path of major current flow of said transistor.

11. A circuit as in claim 10 wherein said common-base amplifier means respond to cessation of pulses from the source and applies back-biasing currents to the first-mentioned of said transistors.

12. A circuit as in claim 9 wherein said amplifier means and said energy storage means and said unidirectional means and said conductive means form first trigger means, said means for triggering said second transistor including second trigger means corresponding to said first trigger means and connected between the source and the input to said second transistor.

References Cited

UNITED STATES PATENTS

| | | | |
|---|---|---|---|
| 2,816,237 | 12/1957 | Hageman | 307—88.5 |
| 2,903,604 | 9/1959 | Henle | 307—88.5 |

J. S. HEYMAN, *Primary Examiner.*

ARTHUR GAUSS, *Examiner.*